United States Patent [19]

Murray et al.

[11] Patent Number: 4,464,514
[45] Date of Patent: Aug. 7, 1984

[54] HIGH CLARITY BLENDS OF POLYVINYL CHLORIDE AND PARA-METHYLSTYRENE-ACRYLONITRILE COPOLYMER

[75] Inventors: James G. Murray, East Brunswick; Edmond L. Suek, Skillman, both of N.J.

[73] Assignee: Mobil Oil Corporation, New York, N.Y.

[21] Appl. No.: 489,873

[22] Filed: Apr. 29, 1983

[51] Int. Cl.³ .................. C08L 27/06; C08L 25/12
[52] U.S. Cl. ................................................ 525/238
[58] Field of Search ....................................... 525/238

[56] References Cited

U.S. PATENT DOCUMENTS

| 2,646,417 | 7/1953 | Jennings | 525/238 |
| 2,988,530 | 6/1961 | Slocombe et al. | 525/238 |
| 3,043,795 | 7/1962 | Roberts et al. | 525/238 |
| 4,306,049 | 12/1981 | Prapas | 525/316 |

Primary Examiner—Carman J. Seccuro
Attorney, Agent, or Firm—Alexander J. McKillop; Michael G. Gilman; Edward J. Trojnar

[57] ABSTRACT

Blends of polyvinyl chloride and copolymers of p-methylstyrene and acrylonitrile exhibit high clarity compared to the blends of polyvinyl chloride and polystyrene.

7 Claims, No Drawings

HIGH CLARITY BLENDS OF POLYVINYL CHLORIDE AND PARA-METHYLSTYRENE-ACRYLONITRILE COPOLYMER

BACKGROUND OF THE INVENTION

Polyvinyl chloride is blended with other resins to improve its processing characteristics and physical properties. For example, polyvinyl chloride has been blended with styrene-acrylonitrile copolymer. While such blends result in the desired improvements in processability and physical properties, the optical characteristics are impaired. In accordance with this invention the improvements in processability and physical properties are obtained without substantial loss of optical properties, particularly clarity.

BRIEF DESCRIPTION OF THE INVENTION

This invention relates to polymeric blends comprising 5 to 90 weight percent of a random copolymer of methylstyrene isomer containing at least 90 percent of the para-isomer and acrylonitrile, and 10 to 95 weight percent of polyvinyl chloride. The blends exhibit high clarity compared to corresponding blends of polyvinyl chloride and styrene-acrylonitrile copolymer and exhibit the improved processing characteristics and physical properties of polyvinyl chloride-(styrene-acrylonitrile) copolymer blends.

DETAILED DESCRIPTION OF THE INVENTION

The components of the blends of this invention are known materials. Polyvinyl chloride is commercially available and random copolymers of methylstyrene isomers with acrylonitrile are described in U.S. Pat. No. 4,306,049 which is incorporated herein by reference.

The polyvinyl chloride polymer contains at least about 80 weight percent of polymerized vinyl chloride with any remainder comprising one or more monoethylenically unsaturated monomer. Thus, the homopolymer of vinyl chloride can be used as well as copolymers of vinyl chloride with a variety of comonomers copolymerizable therewith.

The random copolymer generally comprises 50 to 90 weight percent of methylstyrene and 10 to 50 weight percent of acrylonitrile. The methylstyrene is preferably high in the para-isomer. Generally, the para-isomer comprises at least 90 weight percent of the methylstyrene isomers and most preferably at least about 95 weight percent. The remainder is mostly the meta-isomer with little or no ortho-isomer present in accordance with the disclosure of U.S. Pat. No. 4,306,049.

The blends of this invention are made in the known manner by mixing the two resins above their melting points in suitable equipment such as a roll mill, Banbury mixer, extruder or the like. Temperatures in the range of 165° C. to 175° C. are effective.

The blends can contain additional ingredients such as lubricants, e.g. stearic acid, and stabilizers commonly used in the art. The blends can contain other compatible polymers particularly if the clarity of the blend is not affected. Preferably, the blends contain the polyvinyl chloride polymer and the methylstyrene in acrylonitrile polymer as the sole polymeric constituents.

The blends of this invention are useful in the molding of articles such as containers, particularly in the fabrication of containers in which clarity is a desirable characteristic.

The invention is illustrated by the following non-limiting example in which all parts are by weight.

EXAMPLE

A blend in accordance with this invention was prepared and molded for comparison with control moldings (C-1, C-2, C-3, C-4). The blends were prepared by placing the compositions set forth below on a two roll mill and milling for about five minutes at temperatures ranging from about 165° C. to about 175° C. The milled samples were molded in a PHI press (Pasadena Hydraulics Inc.). The compositions were heated with the platens touching for about five minutes at 190° C., followed by molding for two minutes at 10,000 psi, two minutes at 20,000 psi, two minutes at 30,000 psi, and finally a ten-minute cooling cycle. Light transmission and haze were determined according to ASTM-D1003 and recorded below.

|  | C-1 | C-2 | C-3 | C-4 | Example |
|---|---|---|---|---|---|
| PVC | 100 | — | — | 85 | 85 |
| PMS/AN | — | 100 | — | — | 15 |
| SAN | — | — | 100 | 15 | — |
| Thermolite 31 | 2.0 | — | — | 2.0 | 2.0 |
| Stearic Acid | 0.5 | — | — | 0.5 | 0.5 |
| Gardner Haze | 24.4 | 21.1 | 19.1 | 49.3 | 26.3 |
| Light Trans. | 82.8 | 86.4 | 84.8 | 54.0 | 81.8 |

PVC is a polyvinyl chloride resin obtained from Ethyl Corporation identified as E-185.
SAN is a styrene-acrylonitrile containing a weight ratio of styrene to acrylonitrile of about 70 to 30 available from Monsanto as SAN 31.
PMS/AN is a copolymer of para-methyl styrene and acrylonitrile in a weight ratio of about 70 to 30.
Thermolite 31 is a stabilizer available from M and T Chemicals.

Although the present invention has been described with preferred embodiments, it is to be understood that modifications and variations can be resorted to without departing from the spirit and scope of this invention as those skilled in the art will readily understand. Such variations and modifications are considered to be within the purview and scope of the appended claims.

What is claimed is:

1. In a polymer blend comprising 5 to 90 weight percent of a random copolymer of acrylonitrile and an alkenyl aromatic hydrocarbon, and 10 to 95 weight percent of a polyvinyl chloride polymer containing at least about 80 weight percent polymerized polyvinyl chloride, the improvement comprising using as the sole alkenyl aromatic hydrocarbon a methyl styrene isomer containing at least 90 percent of the para-isomer such that said blend exhibits reduced haze and greater transparency than the corresponding composition in which said alkenyl aromatic hydrocarbon is styrene; said blend being free of additional transparency improving agents.

2. The blend of claim 1 in which said copolymer comprises 5 to 50 weight percent and said polyvinyl chloride comprises 50 to 95 weight percent of the blend.

3. The blend of claim 1 in which said copolymer comprises 5 to 30 weight percent and said polyvinyl chloride comprises 70 to 95 weight percent of said blend.

4. The composition of claim 1 in which said copolymer comprises 50 to 90 weight percent of methylstyrene and 10 to 50 weight percent of acrylonitrile.

5. The composition of claim 1 which exhibits greater optical clarity compared to a blend containing styrene-acrylonitrile copolymer instead of said methylstyrene copolymer.

6. The composition of claim 1 in which said polyvinyl chloride polymer is vinyl chloride homopolymer.

7. The composition of claim 1 in which said copolymer and said polyvinyl chloride polymer are the sole polymeric constituents.

* * * * *